Dec. 18, 1928.
B. C. TRAVIS
1,695,513
PIPE SLOTTING MACHINE
Filed May 1, 1924
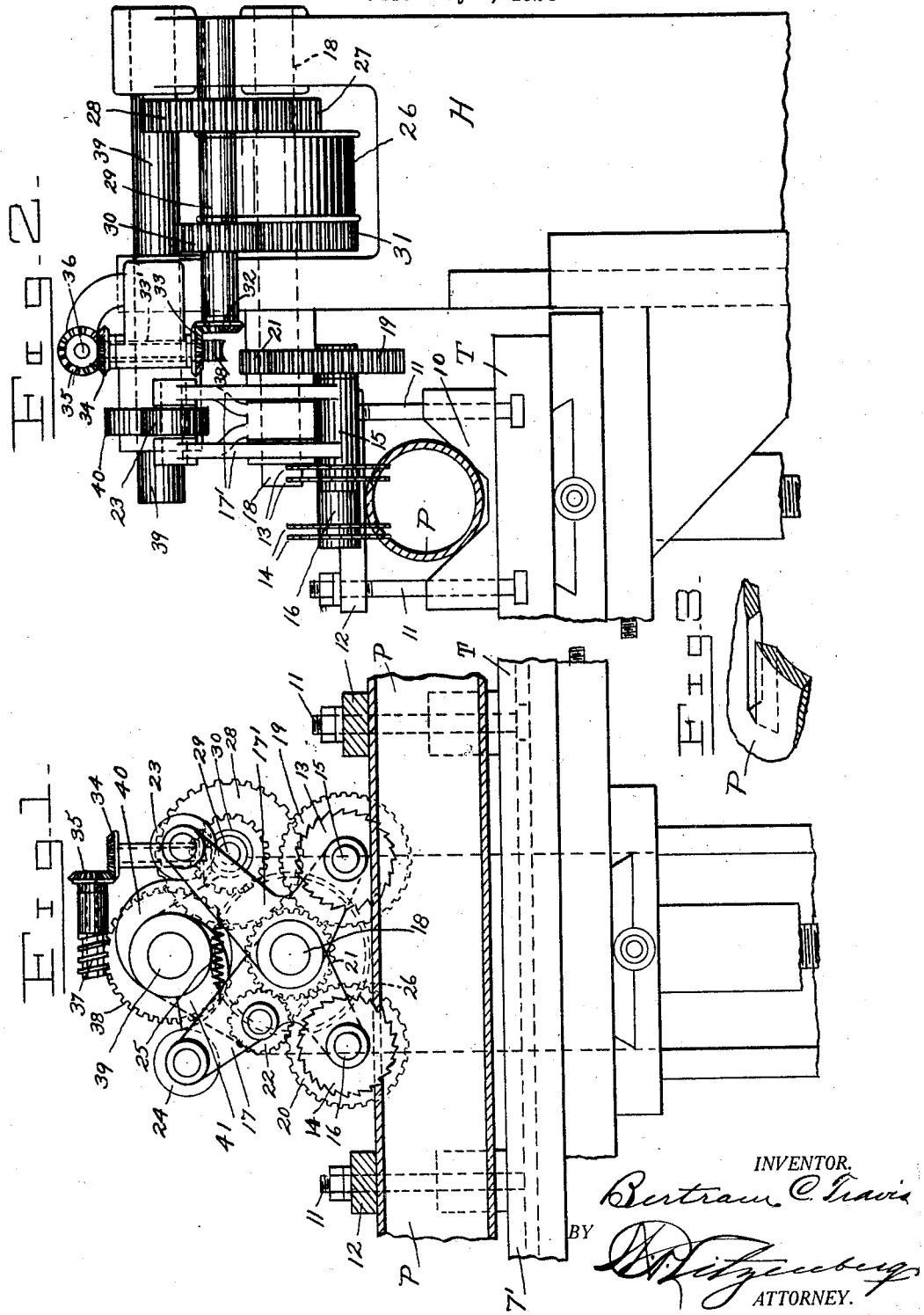
INVENTOR.
Bertram C. Travis
BY
ATTORNEY.

Patented Dec. 18, 1928.

1,695,513

UNITED STATES PATENT OFFICE.

BERTRAM C. TRAVIS, OF LOS ANGELES, CALIFORNIA, ASSIGNOR OF ONE-HALF TO MARK LEVY, OF LOS ANGELES, CALIFORNIA.

PIPE-SLOTTING MACHINE.

Application filed May 1, 1924. Serial No. 710,394.

My invention relates to pipe slotting machines and has for its object to provide a machine for slotting pipe or well casing from the outside with a series of slots which are wider at their inner sides than they are at the outer surface of the pipe or casing, whereby to insure that anything which starts through a slot from the outside will have no obstruction as it moves through the slot, but will have larger space as it passes through the outer face of the slot. In effect, it is a slot beveled from the inside, but with my new invention I am able to slot pipe or casing with this kind of a slot and do it from the outside of the pipe.

In order to clearly explain my invention, I have illustrated one machine embodying my invention on the accompanying sheet of drawings, in which,—

Figure 1 is a side elevation of a machine embodying my invention, in position over a pipe which is shown in vertical longitudinal sectional view;

Figure 2 is an end view of the same machine, showing the pipe in cross section; and Figure 3 is a fragmentary section of a pipe or casing showing the form of the slot cut by my new machine.

Referring in detail to the drawings showing one embodiment of my invention, it will be understood that the broad idea is expressed in operating a saw or cutting element through a pipe at two different angles, but entering the saw at the same place both times, from the outside in the present showing. In the drawings, a pipe P is shown securely held on a table T by means of a shock block 10, with bolts 11, 11, and cross piece 12, thus making it possible, by moving the table in the usual manner, to move the pipe longitudinally, also to move it vertically. The pipe can also be turned in its supported position. The machinery for supporting the pipe and for moving it and for permitting it to be turned to different positions may be of any suitable type and such machinery is in common usage and need not be described in detail in this specification.

In showing and describing this particular embodiment of my invention, I have shown two pairs of saws, as 13, 13 and 14, 14, mounted on two arbors, 15 and 16, carried in the angular rocker arms, 17 and 17', movably mounted on a common or central shaft 18, the saw carrying arbors being provided at their opposite ends with driving gears, as 19 and 20, by which said saws are driven. A driving pinion 21 is shown on shaft 18, and meshes with gear 19 for driving the saws 13, 13. An intermediate gear 22 is carried in the angular rocker arm 17, and is in mesh with the pinion 21 and the gear 20, for driving the saws 14, 14 in a direction opposite to the direction of rotation of the saws 13, 13. This equalizes any thrust action on the pipe or casing as said saws are forced thereinto in their cutting action.

The upper ends of the angular rocker arms or members are provided with anti-friction members or rollers, as at 23 and 24, and said arms are connected together by means of a tension spring, 25, which operates to return the said arms and saws to their normal or inoperative positions when they are released, as hereinafter described.

The driving shaft 18 is suitably mounted in the head H of the main machine, as shown in Fig. 2, and is provided therein with a driving pulley 26, turning loosely thereon, said driving pulley having secured thereto and turning therewith a gear, 27, which meshes with a gear 28, on a shaft 29, which shaft is provided with a pinion 30, which meshes with a gear 31, secured to said shaft 18, for driving the same through said train of gears from the pulley 26 to said gear 31. On the outer end of the shaft 29 is a beveled gear 32, which meshes with a similar gear 33, on the lower end of a vertical shaft, 33', which has a similar gear 34 on its upper end, in mesh with a beveled gear 35, on a shaft 36, provided with a worm 37, in mesh with a worm gear 38, on shaft 39. All of said shafts have suitable bearings in the main machine.

The cam 39 carries two cams of eccentric form, designated 40 and 41, and adapted to engage the anti-friction members 23 and 24, on the upper ends of the rocker arms or members, as shown in Figs. 1 and 2, and by which said arms are moved downwardly in order to move the saws, 13, 13 and 14, 14, into the work, that is, into the pipe P.

Thus it will be seen that the saws are mounted to swing about the center shaft 18 as they move into the work, or pipe P, which permits the saws to clear the work as they enter the pipe, that is, keep the cuttings out of the slot being cut.

The saws are operated in the pipe on one angle, as will be understood from the position of the saws, 14, 14, Fig. 2. Then when the pipe is rotated to bring the slots thus cut by saws 14, 14, in position for the saws, 13, 13, to enter the same slots, said saws 13, 13, will pass through said slots, but at a different angle relative to said pipe, which makes the inside of each slot of wider form, or beveled, as will be understood from the cut being made by said saws, 13, 13, in Fig. 2, and as more clearly illustrated in the enlarged fragmentary view shown in Fig. 3. Thus it will be seen that the real heart of the invention is the idea of forcing a saw or other cutting element through a pipe to cut a slot or opening and then forcing the same or another cutting element through the same opening at a different angle, whereby to provide a slot or opening in which the inner end or border is larger than the outer end or border, that the opening will be of beveled or counter-sunk form on its inner side.

The operation of the machine may be briefly described as follows: The pipe is put in place under the saws. The machine is started and the two sets of saws are forced down through the pipe or casing in the positions shown in Fig. 2, on opposite sides of the center. Then the pipe is rotated sufficiently to put the cuts made by saws 14, 14, under saws 13, 13, and the machine is operated again and the cut is completed in the form as illustrated in Fig. 3. It will be understood, of course, that any desired and suitable number of saws can be arranged for simultaneous operation, in order to increase the output, but the principle involved is the same whether one or more saws be operated, and while I have shown and described but one embodiment of the invention in order to describe it, I do not limit the invention to the showing made except as I may be limited by the hereto appended claims.

I claim:

1. In a machine of the character shown and described, including means for holding a pipe, rocker arms movably mounted to be moved to and from said pipe, pipe slotting tools carried by said arms, means for driving said pipe slotting tools, means for moving said arms toward said pipe to force said cutting tools into said pipe, said tools being spaced from each other transversely of the axis of said pipe, whereby said pipe can be turned to position the cut made by one tool in position to receive the other tool, for the purpose described.

2. In a machine of the character referred to, in combination, means for holding a pipe to be slotted, operating arms movable toward and from said pipe, slotting tools carried by said arms, means for driving said tools, means for moving said arms and tools simultaneously toward said pipe to cut the same, said cutting tools being spaced axially from each other and transversely of the pipe, one cutting tool operating on one side of the center longitudinal axis and the other tool operating on the other side thereof, one of said cutting tools being operated in the same slot cut by the other tool when said pipe is rotated a distance equal to the space between said cutting tools.

Signed at Los Angeles, Los Angeles county, California, this 22 day of April, 1924.

BERTRAM C. TRAVIS.